United States Patent
Hetzel et al.

(10) Patent No.: US 7,220,376 B2
(45) Date of Patent: *May 22, 2007

(54) INDIVIDUALLY-CONTOURED SEAT CUSHION AND SHAPE CAPTURING AND FABRICATING METHOD FOR SEAT CUSHION

(75) Inventors: Thomas R. Hetzel, Littleton, CO (US); Joseph S. Bieganek, Littleton, CO (US)

(73) Assignee: Aspen Seating, LLC, Sheridan, CO (US)

( * ) Notice: Subject to any disclaimer, the term of this patent is extended or adjusted under 35 U.S.C. 154(b) by 117 days.

This patent is subject to a terminal disclaimer.

(21) Appl. No.: 10/628,858

(22) Filed: Jul. 28, 2003

(65) Prior Publication Data

US 2005/0025953 A1    Feb. 3, 2005

(51) Int. Cl.
*B29C 33/40*    (2006.01)
*B29C 67/04*    (2006.01)

(52) U.S. Cl. .................. 264/125; 264/138; 264/220; 264/222

(58) Field of Classification Search ............... 264/138, 264/219, 220, 222, 227, 125
See application file for complete search history.

(56) References Cited

U.S. PATENT DOCUMENTS

| | | |
|---|---|---|
| 1,742,183 A | 1/1930 | Claus |
| 1,961,641 A | 6/1934 | Ollis |
| 2,156,629 A | 5/1939 | Hutchison |
| 2,384,713 A | 9/1945 | Varma |
| 2,472,754 A | 6/1949 | Mead |
| 2,659,418 A | 11/1953 | Berman |
| 2,933,738 A | 4/1960 | Whelan |
| 3,158,878 A | 12/1964 | Pernell |
| 3,177,036 A | 4/1965 | Halter |
| 3,222,694 A | 12/1965 | Schick |
| 3,511,537 A | 5/1970 | Ackermann |
| 3,749,442 A | 7/1973 | Berg et al. |
| 3,919,370 A * | 11/1975 | Cotterell ............... 264/45.4 |
| D238,235 S | 12/1975 | Elgebrandt |
| 3,987,507 A | 10/1976 | Hall |
| 4,132,228 A | 1/1979 | Green |
| 4,327,046 A | 4/1982 | Davis et al. |
| 4,347,213 A | 8/1982 | Rogers, Jr. |
| 4,522,447 A | 6/1985 | Snyder et al. |
| 4,567,887 A | 2/1986 | Couch, Jr. |

(Continued)

FOREIGN PATENT DOCUMENTS

FR    768163    8/1934

(Continued)

*Primary Examiner*—Allan R. Kuhns
(74) *Attorney, Agent, or Firm*—John R. Ley

(57) ABSTRACT

A negative impression of an anatomical portion of a person is captured by forcing the anatomical portion into impression foam to collapse the impression foam into the negative impression. The impression foam has a crush characteristic of approximately constant resistance force over a relatively wide predetermined range of collapse distances. The negative impression is obtained by collapsing the impression foam within the range of constant-force collapse distances, thereby creating the negative impression under conditions which reflect an equally-loaded anatomical portion. A cushion support contour created from the equally-loaded negative impression is beneficial in more appropriately supporting the anatomical portion. The present invention is particularly useful in fabricating wheelchair seat cushions.

61 Claims, 10 Drawing Sheets

U.S. PATENT DOCUMENTS

| | | |
|---|---|---|
| 4,588,229 A | 5/1986 | Jay |
| 4,615,856 A | 10/1986 | Silverman |
| 4,643,481 A | 2/1987 | Saloff et al. |
| 4,682,818 A | 7/1987 | Morell |
| 4,726,624 A | 2/1988 | Jay |
| 4,753,480 A | 6/1988 | Morell |
| 4,756,090 A | 7/1988 | Pedrow |
| 4,824,174 A | 4/1989 | Dunn, Sr. |
| 4,842,330 A | 6/1989 | Jay |
| 4,889,387 A | 12/1989 | Gregory |
| 4,890,235 A | 12/1989 | Reger et al. |
| 4,912,788 A | 4/1990 | Lonardo |
| 4,951,334 A | 8/1990 | Maier |
| 4,972,351 A | 11/1990 | Reger et al. |
| 4,998,354 A | 3/1991 | Silverman et al. |
| 5,018,790 A | 5/1991 | Jay |
| 5,079,790 A | 1/1992 | Pouch |
| 5,092,655 A | 3/1992 | Deegener et al. |
| 5,163,737 A | 11/1992 | Navach et al. |
| 5,180,619 A | 1/1993 | Landi et al. |
| 5,189,747 A | 3/1993 | Mundy et al. |
| 5,193,285 A | 3/1993 | Heinrich et al. |
| 5,255,404 A | 10/1993 | Dinsmoor, III et al. |
| 5,282,286 A | 2/1994 | MacLeish |
| 5,288,135 A | 2/1994 | Forcier et al. |
| 5,294,181 A | 3/1994 | Rose et al. |
| 5,317,773 A | 6/1994 | Graebe |
| 5,333,921 A | 8/1994 | Dinsmoor, III |
| 5,343,876 A | 9/1994 | Rogers |
| 5,352,023 A | 10/1994 | Jay et al. |
| 5,369,829 A | 12/1994 | Jay |
| 5,378,045 A | 1/1995 | Siekman et al. |
| 5,390,384 A | 2/1995 | Dinsmoor, III et al. |
| 5,395,162 A | 3/1995 | Jay et al. |
| 5,397,517 A | 3/1995 | Jay et al. |
| 5,414,884 A | 5/1995 | Mackenzie |
| 5,442,823 A | 8/1995 | Siekman et al. |
| 5,444,881 A | 8/1995 | Landi et al. |
| 5,452,940 A | 9/1995 | Maier |
| 5,457,833 A | 10/1995 | Jay |
| 5,461,741 A | 10/1995 | Graebe |
| 5,470,590 A | 11/1995 | Brubaker et al. |
| 5,490,299 A | 2/1996 | Dinsmoor, III et al. |
| 5,496,610 A | 3/1996 | Landi et al. |
| 5,513,899 A | 5/1996 | Michaels et al. |
| 5,522,106 A | 6/1996 | Harrison et al. |
| 5,524,971 A | 6/1996 | Jay et al. |
| 5,551,107 A | 9/1996 | Graebe |
| 5,551,756 A | 9/1996 | Gurasich et al. |
| 5,592,707 A | 1/1997 | Dinsmoor, III et al. |
| 5,613,256 A | 3/1997 | Hanson |
| 5,613,257 A | 3/1997 | Graebe |
| 5,617,595 A | 4/1997 | Landi et al. |
| 5,671,977 A | 9/1997 | Jay et al. |
| 5,681,092 A | 10/1997 | Hanson et al. |
| 5,687,436 A | 11/1997 | Denton |
| 5,836,025 A | 11/1998 | Poncy, Sr. |
| 5,840,400 A | 11/1998 | Landi et al. |
| 5,920,915 A | 7/1999 | Bainbridge et al. |
| 6,018,832 A | 2/2000 | Graebe |
| 6,032,300 A | 3/2000 | Bainbridge et al. |
| 6,055,676 A | 5/2000 | Bainbridge et al. |
| 6,082,824 A | 7/2000 | Chow |
| 6,161,238 A | 12/2000 | Graebe |
| 6,182,314 B1 | 2/2001 | Frydman |
| 6,241,320 B1 | 6/2001 | Chew et al. |
| 6,293,026 B1 | 9/2001 | Lee et al. |
| 6,293,625 B1 | 9/2001 | Dixon |
| 6,301,722 B1 | 10/2001 | Nickerson et al. |
| 6,345,401 B1 | 2/2002 | Frydman |
| 6,357,054 B1 | 3/2002 | Bainbridge et al. |
| 6,453,477 B1 | 9/2002 | Bainbridge et al. |
| 6,463,351 B1 * | 10/2002 | Clynch ..................... 700/163 |
| 6,493,958 B1 | 12/2002 | Tadin |
| 6,502,263 B1 | 1/2003 | Rowley et al. |
| 6,611,980 B2 | 9/2003 | Wempe |
| 6,625,897 B2 | 9/2003 | Tadin |
| 6,990,744 B2 * | 1/2006 | Bieganek et al. ............. 33/515 |
| 2001/0013146 A1 | 8/2001 | Wempe |
| 2003/0121103 A1 | 7/2003 | Wempe |

FOREIGN PATENT DOCUMENTS

| | | |
|---|---|---|
| GB | 2016918 | 10/1979 |

* cited by examiner

INDIVIDUALLY-CONTOURED SEAT CUSHION AND SHAPE CAPTURING AND FABRICATING METHOD FOR SEAT CUSHION

CROSS-REFERENCE TO RELATED APPLICATIONS

This invention is related to other inventions made by at least one of the inventors herein for Modular Seat Cushion with Interlocking Human Support and Base Portions and Method of Creating a Seat Cushion described in U.S. patent application Ser. No. 10/628,859, and for Contoured Seat Cushion and Method for Offloading Pressure from Skeletal Bone Prominences and Encouraging Proper Postural Alignment described in U.S. patent application Ser. No. 10/628,860, and for Apparatus and Method for Evaluating Clearance from a Contoured Seat Cushion described in U.S. patent application Ser. No. 10/10/628,890, all of which are filed concurrently herewith and all of which are assigned to the assignee of the present invention. The subject matter of these concurrently-filed applications is incorporated herein by reference.

FIELD OF THE INVENTION

This invention relates to seat cushions used to support an individual in a seated or otherwise reclined position. More particularly, the present invention relates to a new and improved technique for capturing the anatomical shape of an individual in a seated or reclined position, and to a new and improved use of that captured anatomical shape to fabricate a support contour of a cushion which complements the anatomy and posture of the user. The present invention allows the anatomical shape of the individual to be captured effectively, conveniently, accurately and inexpensively without the use of relatively expensive and sophisticated measurement equipment, among other things. The present invention is particularly useful in fabricating seat cushions for wheelchairs, although certain aspects of the invention are not limited specifically to such use.

BACKGROUND OF THE INVENTION

A wheelchair seat cushion must perform a number of important functions. The seat cushion should be comfortable and capable of providing proper support for optimal posture and posture control for a considerable length of time. The seat cushion should also assist, or at least not materially hinder, the user in maneuvering the wheelchair, permit a useful range of motion from the pelvis and upper torso of the person, and create stability and security for the person within the wheelchair. Perhaps most importantly, the seat cushion should help prevent and reduce the incidence of pressure ulcers created by prolonged sitting on the cushion without adequate pressure relief. Pressure ulcers can become a very serious health problem for individuals who must remain constantly in contact with the support cushion, and it is important to avoid such pressure ulcers.

Wheelchair users like everyone are of substantially different sizes, weights and shapes. Many wheelchair users have physical disabilities and associated posture and postural control impairments such as those typically caused by congenital disorders. Other wheelchair users, such as those who have been disabled by acquired or traumatic injuries, may have a more typical size and shape. In all of these cases, the support contour of the wheelchair seat cushion must safely support the anatomy of the user, whether the anatomy is abnormal or more typical. Wheelchair seat cushions must fit and perform properly to prevent further physical impairment and pressure ulcers. The cushion must also enhance the functional capabilities of the user by supporting independence in activities of daily living. There are a number of different theories or approaches for configuring the support contour of a wheelchair seat cushion to avoid pressure ulcers and to provide adequate postural alignment.

To provide the best individualized support, the cushion must accommodate the anatomical particularities and preferences of the user. Custom wheelchair cushions are used for this purpose. Most custom wheelchair cushions are created from an impression of the anatomy of the user. After capturing a shape of the user's anatomy, the captured shape is used to construct a mold for the cushion. Then the mold is used to fabricate the cushion, including the support contour which interfaces with the user's anatomy from which the shape was originally captured. There are a number of different theories for configuring the support contour to address the perceived needs and requirements of the user.

The most prevalent approach used to configure the support contour of a custom cushion, at least at the time of filing hereof, is to distribute the weight of the user substantially uniformly over the entire support contour. The uniform pressure distribution is theorized to reduce the incidence of pressure ulcers because the uniform pressure distribution is thought to avoid localized high-pressure points which cause pressure ulcers. The substantial conformance of the support contour to the anatomical shape of the user is also believed to encourage the user toward proper postural alignment.

A new support theory is described in the above-identified U.S. patent application Ser. No. 10/628,860. This new support theory is based on offloading and isolating pressure and shear forces from the skin surrounding the bony prominences of the user's pelvic area skeletal structure. Applying this support theory involves configuring the support contour with additional clearance, and therefore achieving greater pressure relief, around the ischial tuberosities, the greater trochantors, the coccyx and the sacrum in the pelvic area, while transferring more support to the broader tissue and musculature below the proximal thigh leg bones and at the posterior lateral buttocks. Pressure and shear forces on the skin around the bony prominences is relieved, and pressure is transferred to the broader tissue areas to encourage proper postural alignment. The pressure transferred to the broader tissue areas encourages proper postural alignment, while making offloading possible.

To execute successfully any of the different support theories, the support contour of the cushion must be created relative to the captured shape of the individual. Otherwise, the user can not be supported adequately to achieve the desired objectives of the support theory.

There are a number of sophisticated methods and devices available for use to determine and capture anatomical shapes. One type of device is a seating simulator. A seating simulator uses a relatively large chair-like structure in which flexible bags or containers of beads are confined. The user is seated on the bags and the beads distribute themselves around the user's anatomy. A vacuum is then applied within the bags, and the exterior pressure on the bags forces the beads to hold the conforming position. The user is then removed, and the user's shape is captured. Any adjustments are thereafter made. To translate the captured shape into information which can be used to create the custom cushion, relatively sophisticated electronic mapping equipment is moved over the shape held by the bag. A multiplicity of different points across the shape are measured, and the measurements are transferred electronically to a software computational algorithm or program which defines a mathematical simulation of the captured shape of the users anatomy. This simulation is thereafter used to create a mold from which the cushion is formed. Alternatively, a plaster or other material casting is made of the captured shaped directly from the bag while the captured shape is held. The casting is shipped to a cushion manufacturer for interpretation and fabrication of a custom cushion having the desired support contour.

Another type of shape-capturing device uses a two-dimensional grid of plungers or rod-like elements which are brought into contact with the users anatomy. The relative displacement or movement of the plungers due to contact with the anatomy is measured. The measurement data is then transferred electronically and is used by a computational algorithm or program which defines a mathematical simulation of the captured shape. Thereafter, the simulation is used to create a mold from which the cushion is formed.

The described types of shape-capturing equipment are sophisticated and relatively expensive to use, and that expense must be charged as part of the price of the custom cushion. The size of the equipment makes it inconvenient for transportation to the user, which can be a problem or at least an inconvenience if the user cannot travel comfortably. At the very least, the practical cost of the cushion is exaggerated by the added travel expenses and inconvenience to the user.

Even though the described types of shape-capturing and shape-simulating equipment may make hundreds or even thousands of measurements at different locations over the anatomy of the individual, those numbers of measurements might still be relatively coarse, particularly in locations where significant changes in contour of the anatomy occur. The computational shape-simulating programs must interpolate the measurements, and that interpolation may not be entirely accurate. As a consequence, the cushion may not be as comfortable or effective as desired.

A more significant problem with the described types of shape-capturing and shape-simulating equipment is that it does not measure a fully-loaded anatomical shape. A fully-loaded shape is one which accurately reflects the effect of the full weight of the individual against a resistance. The resistance will be from the cushion once it is fabricated. In the case of the shape-capturing equipment which uses beads confined in bags, certain limited areas of the entire anatomy will contact the beads with exaggerated loading, while other areas of the entire anatomy will not naturally contact the beads at all. For example, sitting on the bag will transfer virtually the entire weight of the individual from the tissue surrounding the ischial tuberosities to the beads in the bag. Relatively less or little weight will be transferred from the lateral posterior buttocks and sides of the pelvic area to the beads. In order to simulate the shape of these low weight transfer areas, the beads in the bag must be pushed up against the anatomy. However, pushing the beads against the anatomy does not result in the same shape as would occur from a fully loaded condition in which the weight of the individual is fully and naturally resisted over the entire contact area. The combination of areas of exaggerated loading and simulated loading creates distortion in the captured shape as compared to a fully loaded shape, and this distortion may be reflected by insufficiencies in the support from the cushion.

In the type of shape-capturing equipment which utilizes a grid of plungers, resilient foam or spring-like devices surround each plunger. The resiliency of the foam or springs is intended to create resistance to the weight of the anatomy, thereby allowing the user to sit down on or recline against the plungers. However, the foam or springs do not uniformly load the anatomy. Those portions of the anatomy which depress the plungers to a greater extent will be resisted by greater pressure compared to the resistance from plungers contacting other areas of the anatomy which are less depressed. The amount of resistance increases with an increase in the distance traveled by the plunger. The shape captured from such devices is therefore a non-uniformly loaded shape, in the sense that the resistance is not uniform over the entire area of the anatomy. A cushion formed from a nonuniformly loaded shape may be inadequate.

Another problem with shape-capturing equipment is that the captured shape is based on a static position and posture of the user. For the equipment to capture the image accurately, the user must remain still. In actual use, the user is almost always moving on the cushion. For example, the user is rocking his or her upper torso when turning the wheels of the wheelchair. The user may be leaning from one side to the other when reaching or may be leaning forward to work at a desk. A support contour which is configured from a static anatomical shape is prone to create pressures and shear forces at bony prominences, resulting in an increased risk of pressure ulcers, due to the natural movement of the user.

Because of the necessity to use shape-capturing equipment and because the user must stay stationary while the shape is captured in such equipment, a wheelchair user is not able to test and evaluate the support contour of the cushion before it is formed. The ability of the cushion to protect the skin, to assist the user in manipulating the wheelchair, or at least not to inhibit the user in maneuvering the wheelchair are important aspects of the cushion. If the cushion positions the user too far forward, or too far rearward, or too low or high, the center of gravity within the wheelchair and the ability to maneuver the wheelchair and comfort and safety of the user can be impaired. However, these actual-use aspects of the cushion are only determinable after the cushion has been fabricated.

SUMMARY OF THE INVENTION

This invention involves capturing an accurate and fully-loaded anatomical shape of the user. The shape may be captured in a wheelchair or other environment of intended use of the cushion, rather than in an artificial environment created by a seating-simulator or other shape-capturing equipment. The shape may be captured in a way that reflects changes in position of the anatomy resulting from a range of typical movement of the user. Consequently, the cushion formed from the captured shape will better accommodate the normal movements and range of positions of the user during actual use of the cushion. As part of capturing the shape, the user may actually test the shape in a limited sense to determine its general suitability before the shape is used to form the cushion. The shape-capturing equipment of the invention is relatively inexpensive, and it can be transported easily to the location of the user, rather than requiring the user to travel.

These and other aspects of the invention are realized in a method of capturing a negative impression of an anatomical portion of a person. The method involves selecting impression foam having a crush characteristic of substantially constant crushing force over a predetermined range of collapse distances. The anatomical portion of the person is forced into the impression foam to create the negative impression by collapsing the impression foam. The impression foam is collapsed to an extent which falls within the predetermined range of constant-force collapse distances over the entire negative impression. By collapsing the impression foam from the force from the anatomical portion in this manner, the captured impression reflects the anatomical portion of the person in a fully-loaded or equally-loaded condition. Such a captured impression results and a more effective support contour.

Preferably, the crush characteristic of the impression foam is such that the predetermined range of constant force collapse distances is approximately 80% 90% of an initial thickness of non-collapsed impression foam. The constant crushing force is preferably within the range of 1.50 to 1.85 pounds per square inch. The crush characteristic preferably exhibits a relative lack of structural shear force resistance, causing the captured negative impression to be substantially free of displacement or deformation at edges relative to the shape of the anatomical portion. The force to create the negative impression is preferably obtained by sifting or reclining the person on the impression foam, or otherwise allowing the weight to the person to create the negative impression.

The negative impression is particularly useful for creating a support contour of a wheelchair seat cushion for supporting a pelvic and proximal thigh anatomical portions of a wheelchair user. The impression foam may be positioned on the wheelchair seat support structure itself to obtain the negative impression under the same circumstances that the wheelchair seat cushion will be used. Alternatively, the impression foam may be used in place of a bag of beads on a seating simulator. In capturing the negative impression, the wheelchair user is preferably moved through a range of movement that reflects the normal range of movement in the wheelchair. Because of the ability of the impression foam to support the wheelchair user, the impression foam can be tested on the wheelchair in a limited manner to simulate the comfort and maneuverability available from the seat cushion created from the negative impression.

The negative impression may be adjusted to provide further relief for certain portions of the anatomy, such as at the ischial tuberosities, greater trochanters, coccyx and sacrum, and the perineal area of the person. Enhanced support areas may also be obtained in the final cushion by creating protuberances in a positive mold taken from the negative impression at the lateral posterior buttocks or the proximal thighs of the person. The greater relief and enhanced support areas are particularly beneficial for wheelchair users, although they are also beneficial in other seating and support situations, such as office chairs.

Because of the relative ease of capturing the negative impression, the impression may be obtained at the location of the user and then transported by mail to the manufacturer of the support contour. A container maybe positioned around the impression foam to protect the impression foam from inadvertent indentions which are unrelated to the captured negative impression of the user's anatomical portion.

Another aspect of the invention involves a method of fabricating a cushion. The method involves capturing a negative impression of the anatomical portion, creating a positive mold configuration of the anatomical portion using the captured negative impression, and fusing together a plurality of resilient plastic beads into a support structure which encompasses at least a portion of the positive mold configuration. The resilient plastic beads are fused together at contact points which permit spaces between the beads to establish air ventilation permeability within the seat cushion.

A further aspect of the invention involves cushions, seat cushions and support contours for cushions which are formed by the methods of the present invention.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

BRIEF DESCRIPTION OF THE DRAWINGS

FIG. 4 is a perspective view of the impression foam enclosed within the container shown in FIG. 1, positioned on a seat support structure of a wheelchair, illustrating the practice of one of the steps of the method shown in FIG. 3.

FIG. 5 is a perspective view of a block of impression foam similar to that shown in FIG. 1, positioned in a shell seat of a wheelchair, illustrating the practice of one of the steps of the method shown in FIG. 3.

FIG. 6 is a perspective view of the impression foam enclosed within the container shown in FIG. 1, positioned on a conventional shape-capturing simulator machine, illustrating the practice of one of the steps of the method shown in FIG. 3.

FIG. 7 is a perspective view of an individual seated on the impression foam in the wheelchair shown in FIG. 4, showing an assistant applying additional pressure to the seated individual when creating an impression of the anatomical shape, illustrating the practice of a step of the method shown in FIG. 3.

FIG. 8 is a perspective view similar to FIG. 7, illustrating an additional aspect of the step shown in FIG. 7, and also illustrating the creation of a dynamic impression in accordance with the practice of steps of the method shown in FIG. 3.

FIG. 9 is a perspective view of the impression foam enclosed within the container structure shown in FIG. 1, in which an impression of the anatomical shape of an individual has been captured by executing the steps shown in FIGS. 4, 7 and 8, illustrating the practice of another step of the method shown in FIG. 3.

FIG. 10 is a perspective view showing adjustments to the shape captured within the impression foam shown in FIG. 9 to provide areas of greater relief in the support contour of the cushion, illustrating the practice of another step of the method shown in FIG. 3.

FIG. 11 is a perspective view illustrating the relief-adjusted shape shown in FIG. 10, around which a mold form has been placed and into which liquid molding material is placed, illustrating the practice of another step of the method shown in FIG. 3.

FIG. 12 is a perspective view of a positive mold of the relief-adjusted impression shown in FIG. 10, after hardening the molding material shown in FIG. 11, illustrating the practice of another step of the method shown in FIG. 3.

FIG. 13 is a perspective view showing adjustments to the positive mold shown in FIG. 9, to provide areas of enhanced protrusion in the support contour of the cushion, illustrating the practice of another step of the method shown in FIG. 3.

FIG. 14 is a perspective view of the protrusion-enhanced positive mold shown in FIG. 13, inserted within a cushion-forming form, illustrating the practice of another step of the method shown in FIG. 3.

FIG. 15 is a perspective view of the protrusion-enhanced positive mold within the cushion-forming form shown in FIG. 13, into which plastic beads are added, illustrating the practice of another step of the method shown in FIG. 3.

FIG. 16 is a perspective view of the cushion-forming form shown in FIG. 15, with an upper enclosure placed thereon to confine the plastic beads within the cushion-forming form as a part of creating a support structure from the beads, illustrating the practice of another step of the method shown in FIG. 3.

FIG. 17 is a perspective view of the positive mold shown in FIG. 13 and the support structure formed around the positive mold as shown in FIG. 15, illustrating the practice of another step of the method shown in FIG. 3.

FIG. 18 is a perspective view of the support structure shown in FIG. 16 with the cushion-forming form removed, illustrating the practice of another step of the method shown in FIG. 3.

DETAILED DESCRIPTION

Figure 1:
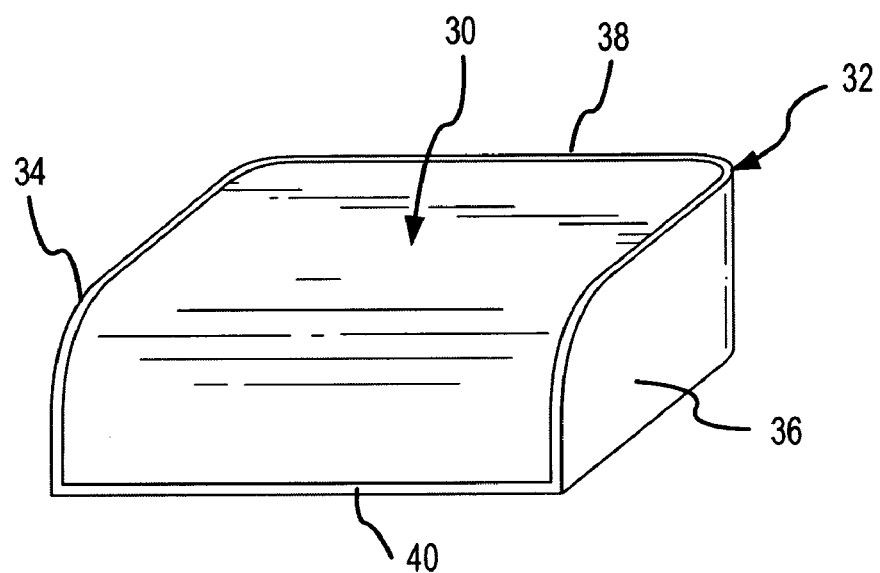
FIG. 1 is a perspective view of a block impression foam which is substantially enclosed within a container structure, exemplifying one type of use of impression foam in accordance with the present invention.

This invention makes use of a piece or block 30 of impression foam, shown in FIG. 1, to capture the shape of an anatomical portion of the individual, to fabricate a cushion 31 (FIG. 19) having a support contour 33 (FIG. 19) to support that captured part of the anatomy of the individual. The anatomical shape is captured by contacting the individual with the block 30 of impression foam, such as by having an individual sit or recline on block 30 (shown in FIGS. 7 and 8). The weight or force of the individual crushes or indents the impression foam block 30 into an impression 35 (FIG. 9) which is a highly accurate negative impression of the individual's anatomical shape which contacted the impression foam.

Figure 7:
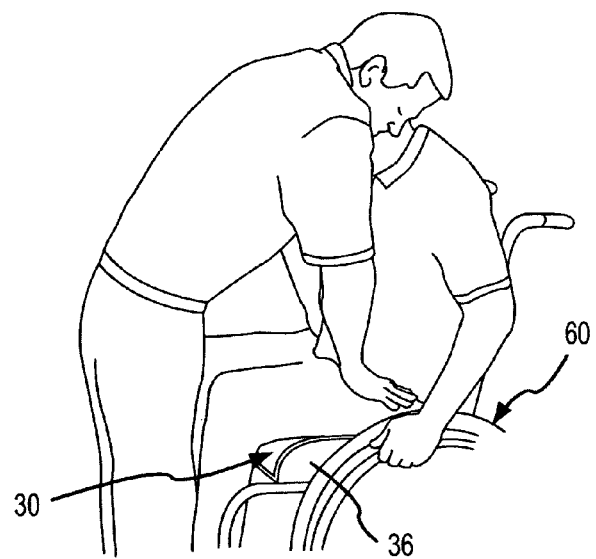
Figure 8:
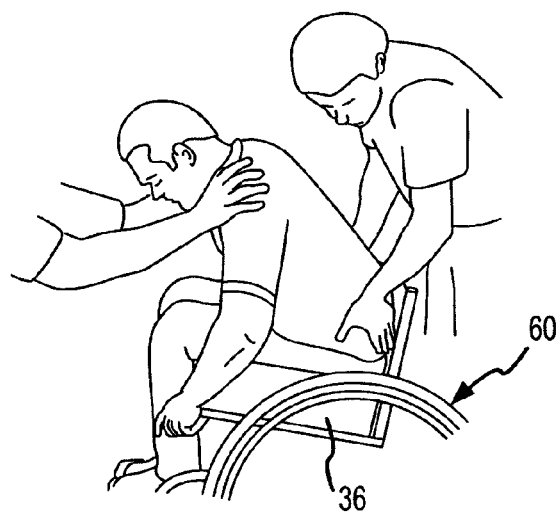

To facilitate transportation and use of the block 30 of impression foam, shown in FIG. 1, the block 30 is typically enclosed in a relatively rigid container 32, formed by sidewalls 34 and 36, a back wall 38 and a bottom wall 40. The relatively rigid container 32 protects the block 30 of impression foam so that inadvertent or unintended crushing of the block 30 will not occur except when placed in contact with the individual's anatomy. The container 32 does not include a wall which extends across the front vertical surface of the foam block 30 between the sidewalls 34 and 36 and the bottom wall 40, so that the user may sit on the foam block 30 and have his or her legs bend over the front surface of the foam block (FIGS. 7 and 8). Although not shown in FIG. 1, a lid structure may fit over the foam block 30 and the rigid container 32 to protect the upper and front surfaces of the foam block 30 prior to its use in capturing the anatomical shape.

A highly accurate shape 35 (FIG. 9) or negative impression is obtained from the crush characteristics of the impression foam block 30. The crush characteristics are illustrated by the curve 42 shown in FIG. 2. The amount of force required to crush the foam over a considerable distance is referenced at point 44. The crush force 44 remains essentially constant from point 46 to approximately point 48. When the foam has been crushed to the extent represented by point 48, the crushing force increases substantially and almost instantaneously within a relatively slight further crushing distance. Crushing the impression foam past point 48 requires substantially increased force, as shown by the almost vertical extension of the curve 42 past point 48.

It is within the range of crushing distances between points and 46 and 48 that the impression foam of the present invention should be used. Point 46 represents the uncrushed surface of the foam block 30 (FIG. 1) and point 48 represents the maximum depth to which the impression foam can be collapsed from its original surface while experiencing approximately constant crush force 44. The distance represented between the points 46 and 48 is related to the initial thickness of the foam block 30 (FIG. 1). The distance between points 46 and 50 represents a typical initial thickness of a foam block which will achieve a constant force or resistance crushing depth between points 46 and 48.

The considerable degree or distance of collapse at the relatively constant resistance or force 44 allows a fully-loaded impression of the anatomical shape to be captured. A fully-loaded impression or shape 35 (FIG. 9) is that created by equal resistance on and over substantially all portions of the shape 35 as it is fully formed, without more resistance being applied in some areas of the anatomical shape compared to the amount of resistance applied in other areas. As a result of forming the negative impression of the anatomical shape by crushing the foam with approximately equal resistance independent of the extent or amount of crushing or indentation, the characteristics of the negative impression 35 (FIG. 9) more accurately reflect the true, equally-loaded or fully-loaded anatomical shape. By obtaining the negative impression of a fully-loaded anatomical shape, the shape of the cushion support contour will better interact with the anatomy to support the user as desired.

Figure 2:
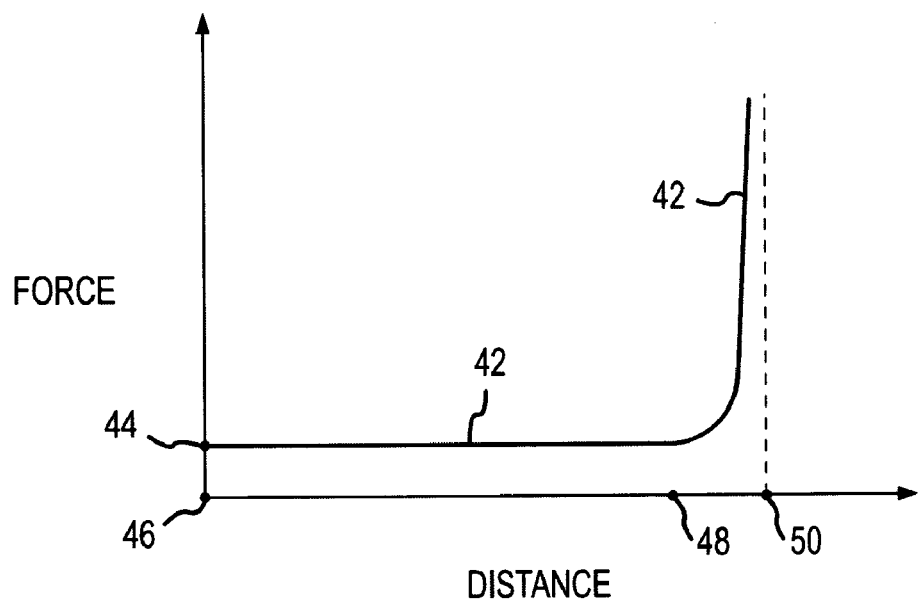
FIG. 2 is a graph illustrating a relationship of crush distance and crush resistance characteristics of the impression foam, shown in FIG. 1, which is used in accordance with the present invention.

In addition to the desired crush-distance characteristics of the impression foam shown in FIG. 2, the impression foam has an extremely low modulus of elasticity, making it very brittle and inelastic. The crushed portions of the impression foam are permanently collapsed, and will rebound only insignificantly when the crushing force is removed. This characteristic allows the impression form to retain the shape that was pressed into it. Coupled with its brittleness, the foam has very slight compressive strength. The slight compression strength allows for accurate and precise deformation of the foam without deflection of the forcing source. The impression foam also has a relative lack of structural shear force resistance. Shear force resistance refers to the ability of the structural lattice to resist relative sliding motion through a plane in the lattice. The structural lattice strength of the impression foam allows shear without deformation of any adjoining areas. Consequently, the resulting impression is almost exact complement of the shape which created the impression, with virtually no displacement or deformation around the edges of the impression.

The impression foam collapses or crushes by first crushing the layers of the foam lattice adjacent to the forcing shape which causes the impression. As the crushing progresses, thin layers of crushed or failed material build up adjacent to the forcing shape because those failed layers have been fully compressed, in the same manner as full compression of the entire thickness of the impression foam is represented by the distance between points 48 and 50 shown in FIG. 2. Thin layers of the impression foam material beneath the fully crushed layers surrounding the forcing shape continue to crush at the uniform resistance or force represented by point 44 in FIG. 2 until the extent of the crushing reaches point 48.

Impression foam which has proved satisfactory has a preferred crushing force resistance of approximately 1.56 pounds per square inch. In general, however, an acceptable range of crushing force resistance will be within the range of 1.50-1.85 pounds per square inch. Higher crushing forces will not allow the weight of the user to indent into the impression foam an adequate amount. Lower crushing force resistance will cause the impression foam to crumble and crack, making the impression useless.

The average ratio of the original height or thickness of the impression foam (the distance between points 46 and 50, FIG. 2) and the distance that the impression foam will crush under relatively uniform force or resistance (the distance between points 46 and 48, FIG. 2) is preferably equal to or greater than 5 to 1 (5:1), meaning that the impression foam will crush or collapse to at least 80% of its initial thickness under the uniform resistance or constant force 44. The average ratio of the original starting thickness of the impression foam to the maximum compressed height at the asymptotic limit of the vertically extending portion of the curve 42 (FIG. 2), is approximately 10 to 1 (10:1), meaning that the impression foam will crush or collapse to about 90% of its initial thickness at the point 50.

Impression foam having these preferred characteristics is similar to the type of foam used by florists in creating flower arrangements. However, much of the floral foam does not crush sufficiently within the preferred range of crushing force resistance. Some of the other preferred characteristics of the impression foam may also be met by typical floral foam. However, manufacturers of floral foam are able to adjust their fabrication processes to achieve impression foam having the characteristics preferred for use in this invention.

Figure 3:
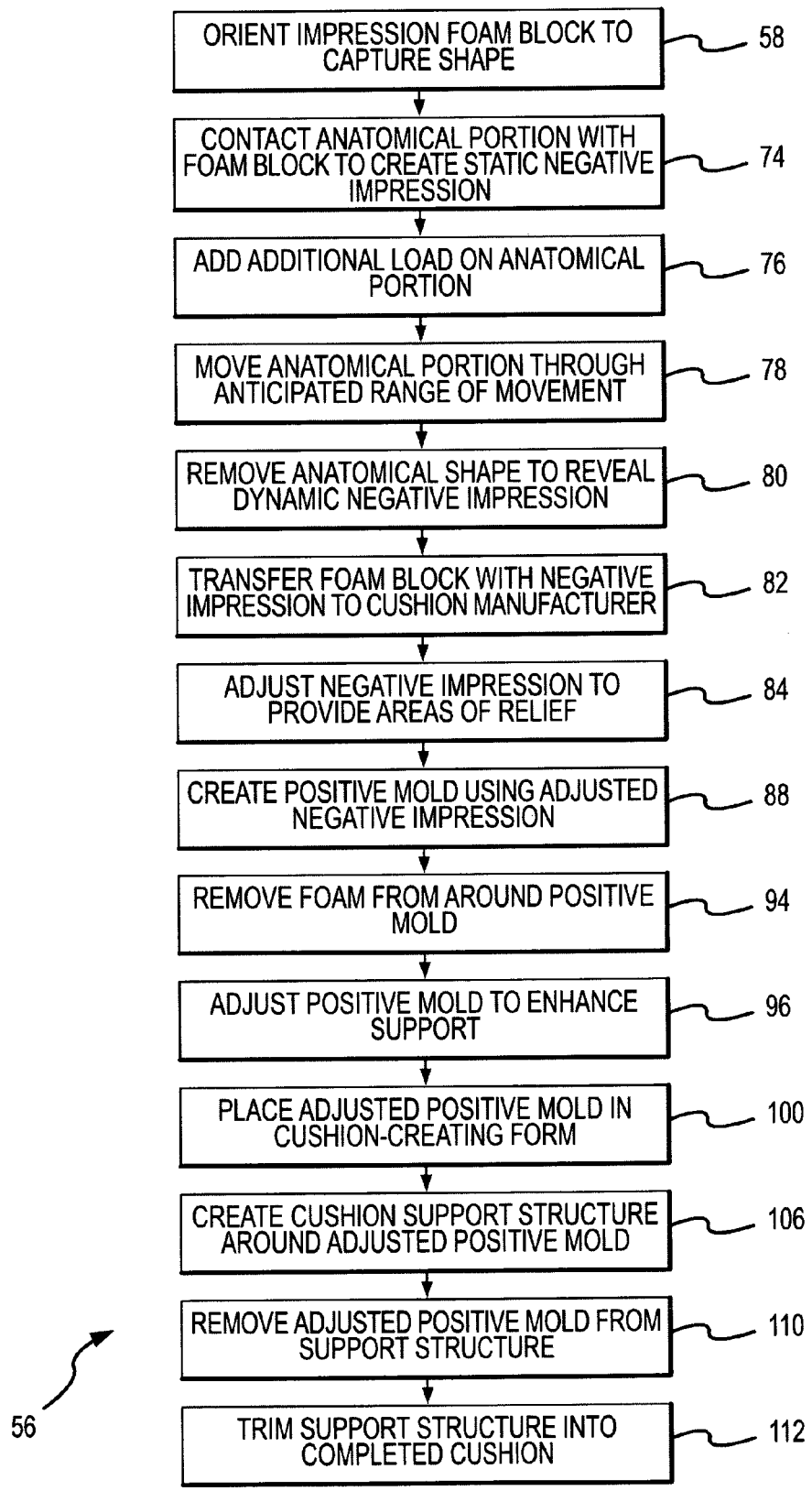
FIG. 3 is a flowchart of steps illustrating a method using the impression foam shown in FIGS. 1 and 2 to capture an anatomical shape used to create a support contour of a cushion, in accordance with the present invention.

The impression foam is used to fabricate a seat cushion by practicing the method 56 shown in FIG. 3. The steps shown in FIG. 3 are referenced by individual reference numbers and are also illustrated graphically in FIGS. 4-18. The details of the method 56 shown in FIG. 3 are explained in conjunction with FIGS. 4-18.

Figure 4:
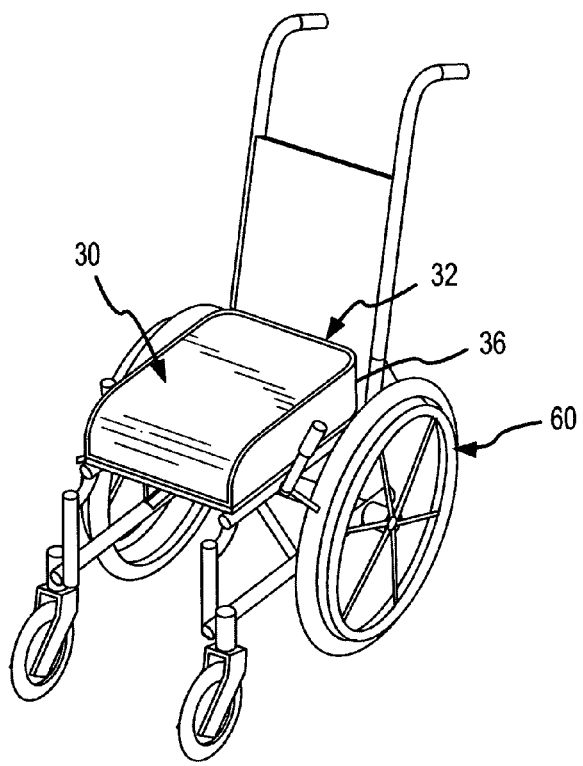
FIGS. 4-18 are graphical representations of steps in the method shown in FIG. 3.

The first step 58 of the method 56 shown in FIG. 3 is to select a particular configuration of a block 30 of impression foam (FIG. 1) and orient it to capture the negative impression or shape of the anatomical portion of the user's body. Selecting the particular configuration of the foam block 30 is related to orienting it for capturing the shape. For example, a foam block 30 in the rigid container 32 may be positioned on a seat support structure of a conventional wheelchair 60, as shown in FIG. 4. In this case, the user will sit directly on the foam block 30 while positioned in the wheelchair 60, in the same manner that the user would sit on the cushion formed by the shape captured by the foam block 30.

Figure 5:
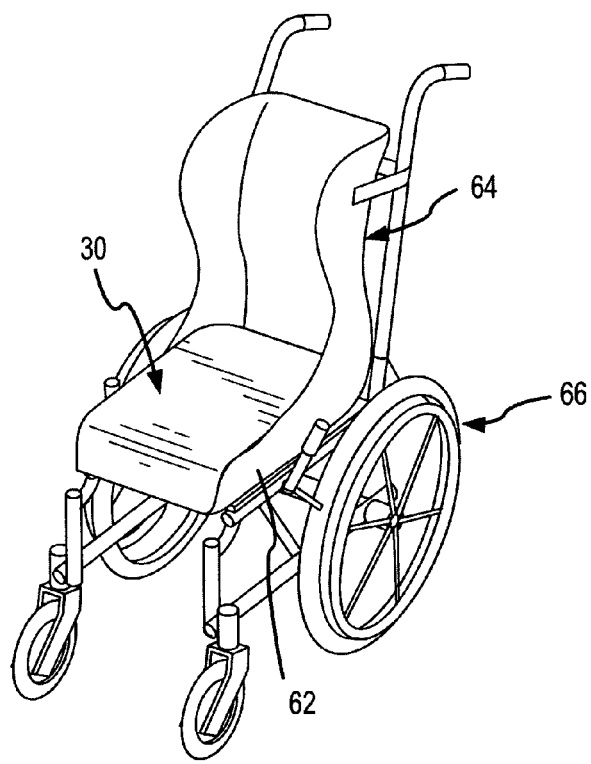

Another example of practicing the step 58 (FIG. 3) is shown in FIG. 5. There, the foam block 30 is removed from the rigid container 32 (FIG. 1) and the foam block 30 is shaped to be received within a pan seat portion 62 of a shell seat 64 which is attached to a wheelchair 66. In this case, the user will sit directly on the foam block 30 while positioned in the shell seat 64, in the same manner that the user would sit on a cushion fitted into the shell seat 64.

Figure 6:
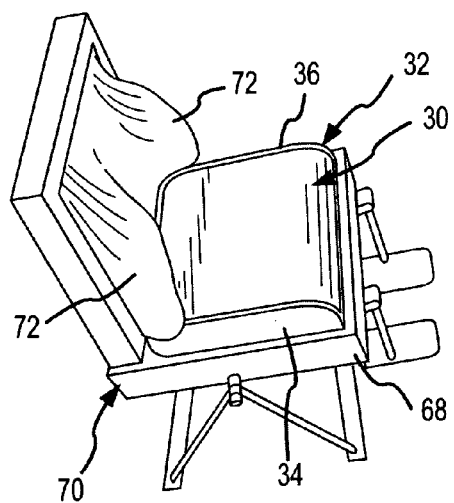

FIG. 6 shows another example of positioning and orienting the foam block 30 to capture the negative impression of an anatomical shape. The foam block 30 and the rigid container 32 are attached to a horizontal seat portion 68 of a conventional seating simulator 70. The seating simulator 70 is of the type which normally includes a bag 72 containing beads which will be conformed around part of the anatomy of the user and then held in place by vacuum applied to the bag. In the circumstance shown in FIG. 6, the foam block 30 and the rigid container 32 are used in place of a bag, which would normally be positioned on the horizontal seat portion 68 of the simulator 70. The conventional bag 72 is still used on the vertical back part of the seating simulation.

Once the foam block has been oriented, as shown in FIGS. 4-6, the user sits down on the foam block 30, or otherwise the portion of his or her anatomy to be supported by the cushion is forced into contact with the foam block 30 (74, FIG. 3). FIG. 7 illustrates the user sitting on the foam block 30 within the wheelchair 60 (also see FIG. 4). The weight of the user crushes the impression foam 30 and forms a negative impression 35 (FIG. 9) of the shape of the portion of the users anatomy in contact with the foam block 30.

In addition to the normal weight of the user, it may be advantageous for an assistant to press the user more firmly down into the foam block, as shown at 76 in FIG. 3 and in FIGS. 7 and 8. Pressing the user down in the manner shown in FIGS. 7 and 8 assures that a complete fully-loaded impression of the anatomical portion of the user is created. Despite the relatively small crush resistance force of the impression foam, the relatively large surface area of the buttocks and legs may partially resist the creation of a complete impression 35. Pressing the user down as shown in FIGS. 7 and 8 does not diminish or otherwise change the fully-loaded characteristics of the impression created, because the added force is distributed throughout the entire anatomical area which is being captured by the negative impression in the impression foam 30. None of the added pressure is unequally distributed to impact adversely the fully-loaded or equally-loaded impression 35 created by crushing the impression foam. Adding the extra pressure or force to the anatomical portion from which the negative impression is created is optional. The necessity to add the extra pressure or force will be determined by the surface area and other characteristics of the impression which must be created, the weight naturally applied by the user, and the crush resistance force of the foam block.

After establishing the desired initial negative impression, as illustrated in FIG. 7, the user is moved through a normal range of motion as exemplified by the two positions of the user shown in FIGS. 7 and 8 and as shown at step 78 (FIG. 3). In the example shown in FIGS. 7 and 8, the upper torso of the user is moved from the upright position shown in FIG. 7 to the forward pivoted position shown in FIG. 8. This range of motion is repeated to assure that the dynamic aspects of this type of user movement will be reflected in the negative impression created in the foam block. The upright and forward-tilted positions shown in FIGS. 7 and 8 generally represent the range of motion that a wheelchair user may experience when pushing the drive wheels of the wheelchair. Any other type of movement that the wheelchair user might normally make, such as side to side movement, reaching, or the like, may also be undertaken while the user is seated on the foam block 30. In this manner, the effect of dynamic movement of the user will be reflected in the negative impression 35 in the foam block 30. The reflections of the dynamic range of motion adjust the configuration of the negative impression 35 (FIG. 9) so that the cushion formed from the negative impression will provide more accurate and comfortable support to the user throughout his or her range of normal use activities.

Figure 9:
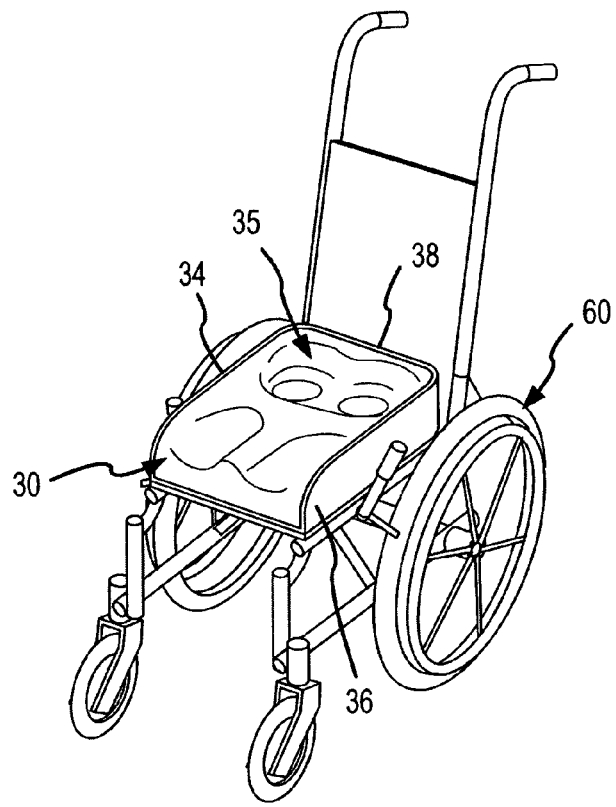

After the negative impression in the foam block has been made, additionally loaded, and moved through a dynamic range of movement, as shown at 74, 76 and 78 in FIG. 3, respectively, the user is removed from contact with the foam block, as shown at step 80 (FIG. 3) and in FIG. 9. FIG. 9 shows the negative shape or impression 35 which has been created in the foam block 30 as a result of crushing the impression foam.

Thereafter, the foam block with the negative impression or shape 35 is removed and physically transferred to the cushion manufacturer. The transfer may occur by mail, after the foam block 30 with the negative impression 35 has been sufficiently protected in the rigid container 32 and a top (not shown) has been attached to the container 32 to allow it to be transferred without deforming the negative impression 35.

Not shown in FIGS. 4-9 is the possibility of positioning the foam block 30 and rigid container 32 on a horizontal surface so that the user can sit on it, apart from a wheelchair or other simulating device to obtain the negative impression 35. The relative simplicity of using the foam block 30 and container 32 avoids the need for expensive seating simulators and other types of complex shape-capturing devices. The foam block 30 and container 32 may be taken directly to the user at the user's home, and an impression taken at that location, without requiring the user to travel to the location of the shape-capturing equipment.

Once the foam block 30 containing the negative impression 35 (FIG. 9) is received by the cushion manufacturer, the negative impression 35 may be adjusted in accordance with a desired support theory to provide greater relief or clearance in certain areas and/or enhanced support in other areas, or simply to simulate the captured shape without modifications. Adjusting the captured impression 35 is shown at 84 in FIG. 3 and in FIG. 10. The adjustments to the negative impression to provide greater relief in certain areas are made with the use of a shaping tool 86 to crush certain areas of the negative impression 35 to a greater extent than they have already been crushed by the anatomical shape of the individual. Further crushing of the specific areas will result in a relieved negative impression 35a which provides greater clearance or separation between the anatomical shape and the cushion in those areas. By further crushing the negative impression 35 in selected areas, a greater amount of separation or clearance from the anatomy is established in those areas. The greater clearance may be beneficial in certain areas where there are higher risks of pressure ulcers, such as on the skin which surrounds the ischial tuberosities, the greater trochanters, the coccyx and sacrum, and in the perineal or genital area where the skin may be prone to breakdown due to heat and moisture. This application of one type of support theory is described more completely in the above-identified U.S. patent application Ser. No. 10/628,860.

If the negative impression 35 is taken by a person qualified to modify the negative impression to provide greater relief, the adjustment to the negative impression 35 can be evaluated by the user prior to completing the cushion. The foam block with the adjusted negative impression 35a is placed back into the wheelchair of the user, and the user can use that foam block as an example of the pressure-relieved aspects of the completed cushion, by maneuvering the wheelchair and moving his or her body within the wheelchair. Of course the extent of movement is limited so as not to break down the foam, but nevertheless enough movement may be accomplished for the user to determine the acceptability of the pressure-relief and clearance aspects of the support contour of the final cushion.

Further crushing specific areas of the negative impression 35 may not be required if a different support theory is applied to construct the cushion, for example the equal pressure distribution theory. In those circumstances where the support theory does not adjust the negative impression, the user can evaluate the feeling of the final cushion from the impression 35 in the foam block 30. In those circumstances, the negative impression 35 will become the support contour 33 of the finally constructed cushion 31 (FIG. 18), and the user can evaluate that support contour from the negative impression 35 directly created in the foam block.

Figure 11:
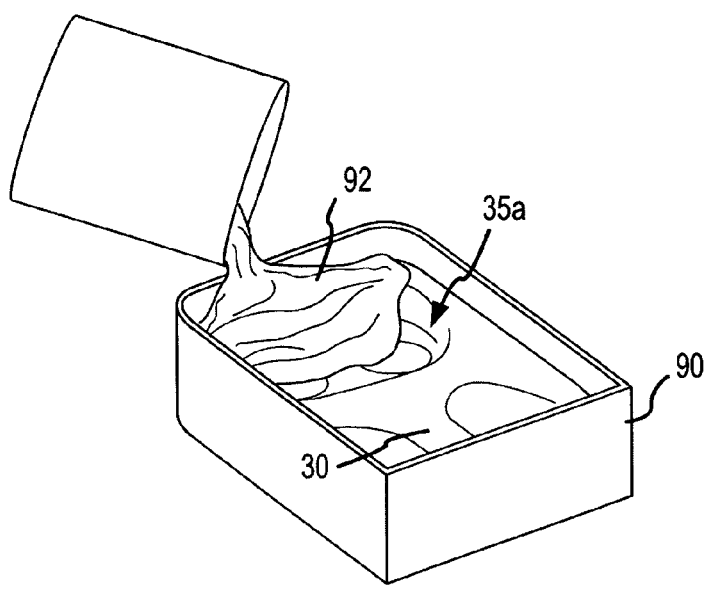
Figure 12:
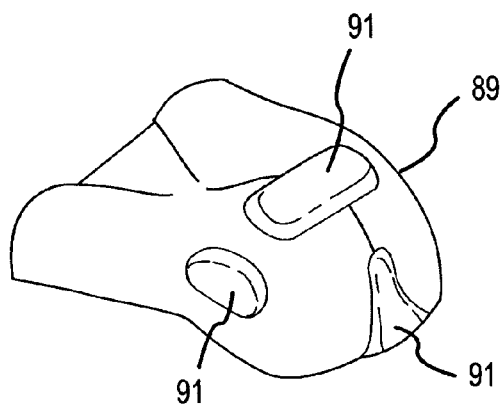

Next, the relieved negative impression 35a, is used to create a positive mold 89 (FIG. 12) of the relieved negative impression 35a, as shown at step 88 in FIG. 3. The positive mold 89 (FIG. 12) is an accurate simulation of the anatomical portion of the user, as influenced by the range of motion, and as influenced by any adjustments to create the relieved negative impression 35a. The positive mold 89 is created as shown in FIG. 11 by first placing the relieved negative impression 35a into a mold box 90. Thereafter, fluid molding material 92, such as plaster of Paris, is added to the mold box 90 to cover and completely fill the relieved negative impression 35a. In addition, enough molding material 92 is added to the mold box 90 to create enough substance in the resulting positive mold 89 so that the positive mold structure will not inadvertently break into pieces, crack or crumble.

Figure 10:
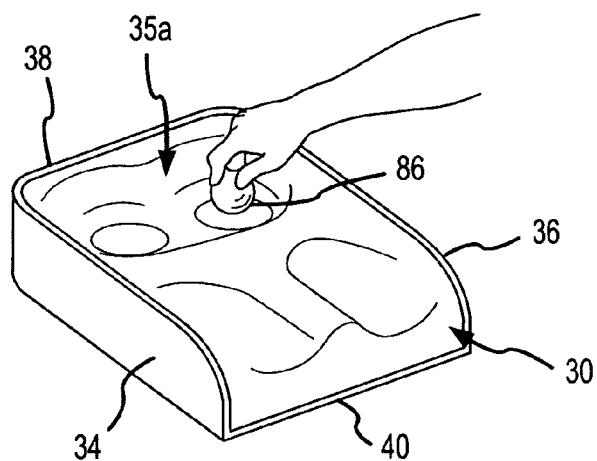

After the mold box 90 has been filled with the fluid molding material 92, the molding material is solidified or hardened. The solidified molding material 92 captures the shape of the relieved negative impression 35a (FIG. 10). The foam block 30 is removed from around the solidified molding material, as shown at 94 in FIG. 3 and in FIG. 12, to reveal the resulting positive mold 89. The shape of the positive mold 89 is identical to the shape of the anatomical portion of the user, which has been moved through the range of movement (FIGS. 7 and 8) and adjusted (35a) to provide greater pressure and clearance relief in certain areas 91 where the negative impression 35 was further indented in accordance with the support theory as discussed in conjunction with FIG. 10. (The added clearance in the perineal area is not shown.) The shape of the positive mold 89 is complementary in shape to the relieved negative impression 35a (FIG. 10).

To the extent that the positive mold 89 may have slight rough surfaces or slight irregularities, the shape of the positive mold 89 may be smoothed and otherwise contoured. The amount of smoothing or contouring required depends to some degree on the consistency of the fluid molding material which solidified around it and the ability to remove trapped air bubbles in the fluid molding material.

Figure 13:
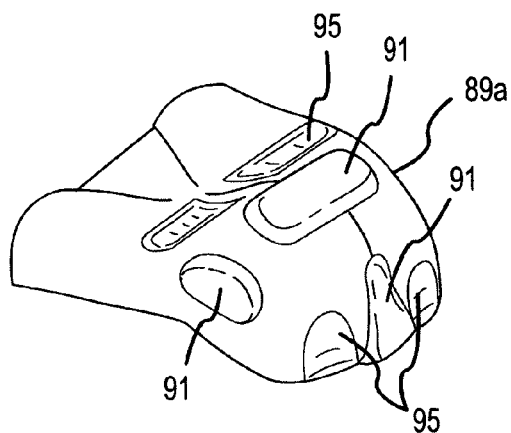

In addition, material is removed from areas 95 of the positive mold 89 to enhance the support characteristics and offloading of bony prominence as described in U.S. patent application Ser. No. 10/628,860. Removing material from the areas 95 of the mold 89, as shown at 96 in FIG. 3 and in FIG. 13, will create complementary areas of the support contour 33 of the finally-constructed cushion 31 to protrude or extend more into the anatomy of the user, because removal of the material from the mold 89 in the areas 95 causes more support material to be formed in the completed cushion at those areas. The removal of material from the mold 89 in the areas 95 creates a protrusion-enhanced mold 89a, as shown in FIG. 13.

The protrusion-enhanced mold 89a therefore defines configurations where the finally-constructed cushion will provide areas of enhanced or projected support and areas 91 of greater relief. Of course, the areas of enhanced support 95 may be employed only to the extent required by the support theory, just as with the areas 91 of greater relief.

Figure 14:
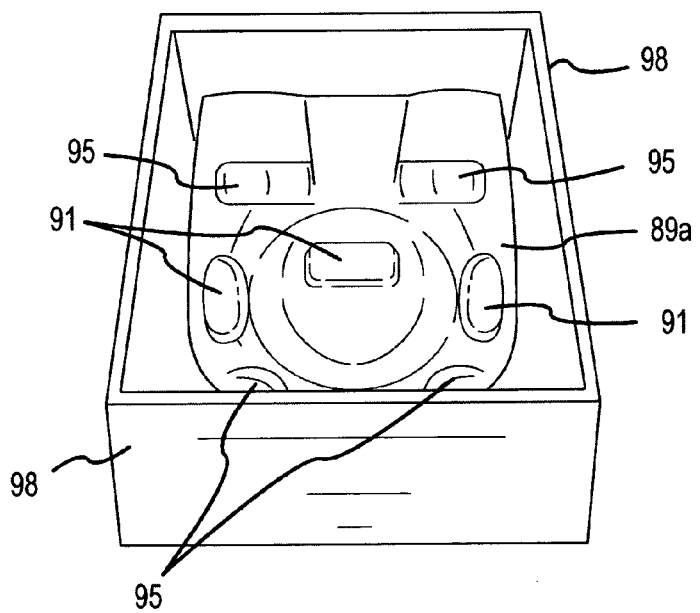
Figure 15:
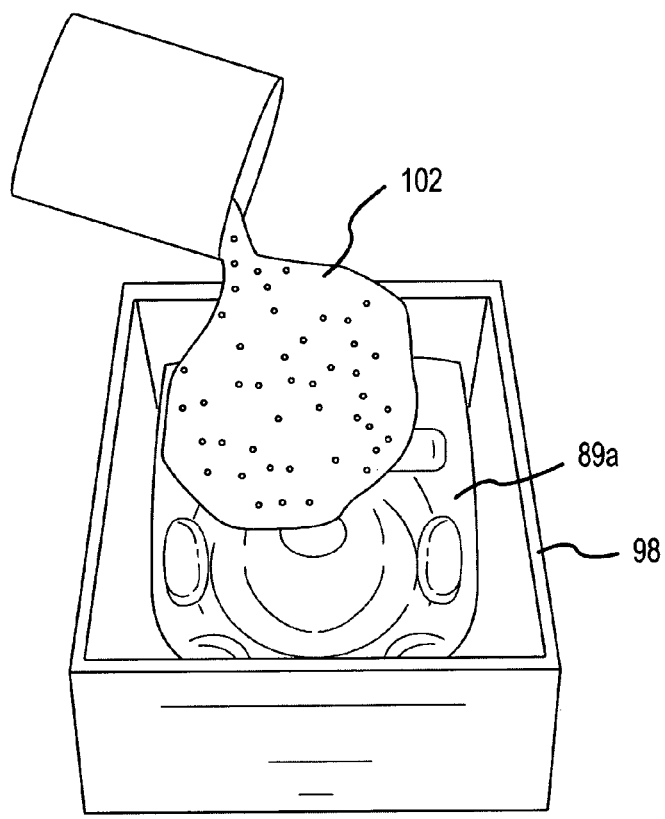
Figure 16:
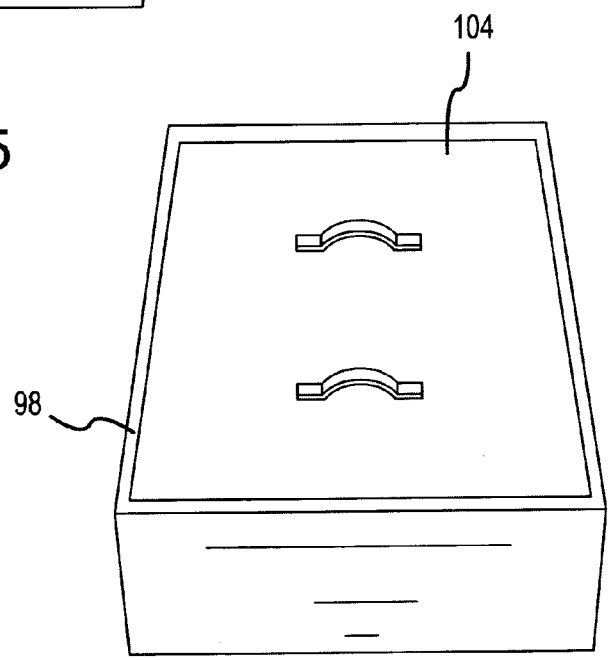

The protrusion-enhanced positive mold 89a is thereafter placed in a form 98, as shown at 100 in FIG. 3 and in FIG. 14. Moldable material 102 capable of forming the cushion 31 (FIG. 19) is thereafter added into the interior of the form 98 to completely engulf and surround the positive mold 89a, as shown in FIG. 15. The moldable material 102 is confined within the form 98 by placing a lid 104 on the form 98, as shown in FIG. 16. Thereafter, with the moldable material 102 confined within the form 98 and engulfing and surrounding the positive mold 89a, the moldable material 102 is allowed to cure as shown at 106 in FIG. 3.

Moldable material 102 capable of forming the cushion will typically be a synthetic foam material which is fluid when surrounding the positive mold 89a but which later cures into a more rigid but nevertheless resilient support structure 108 (FIG. 18) from which the cushion 31 (FIG. 19) is formed. There are a number of different types of synthetic resilient plastic foam materials which meet these requirements. The cushion manufacturer selects the type of synthetic resilient plastic foam material to be used in forming the cushion, according to the resiliency characteristics of the plastic foam material desired.

The type of moldable material 102 preferred for use in the present invention is generally circular polyethylene beads. The polyethylene beads are poured into the cushion-creating form 98 as shown in FIG. 15. Each of the polyethylene beads is formed with an exterior coating which is activated by heat. Once activated, the coating of each bead adheres to the coating of its adjoining beads, thereby linking all of the beads together in a single matrix-like structure which forms the resilient support structure 108 (FIG. 18) from which the cushion 31 (FIG. 19) is formed.

The plastic beads are available in different shapes, sizes, densities and materials. For polyethylene spherical beads, the typical diameter is in the range of 0.1875 to 0.25 inches, and the typical density is in the range of 12 grams per liter to 27 grams per liter. As described in the above-referenced U.S. patent application Ser. No. 10/628,859 the cushion may be formed with an upper human interface portion that presents the contour 33 and a lower base portion which completes the cushion. In that case, the size and density of the plastic beads may be different for each of the upper and lower portions, to impart different resiliency characteristics to each different portion. For example, spherical polyethylene beads of approximately 0.25 inches in diameter and 12 grams per liter may be used for the human interface portion and spherical polyethylene beads of approximately 0.1875 inches in diameter and 27 grams per liter may be used for the base portion. In those circumstances, the upper human interface portion will have somewhat more resiliency while the base portion will have somewhat less resiliency. When square or pillow-shaped polypropylene beads are used, the size may be in the range of approximately 0.1875 inches on the side to approximately 0.09375 inches on the side, with a density of approximately 29 grams per liter.

By adjusting the size and density of the beads added into the cushion-creating form 98 (FIG. 15) and the relative amount of compression of the beads created when the beads are held in the form 98 by the lid 104 (FIG. 16) prior to heating to fuse them together at the contact points, the resiliency characteristics of the support structure 108 (FIG. 18) and the cushion 31 (FIG. 19) are adjusted in accordance with desired characteristics.

Figure 18:
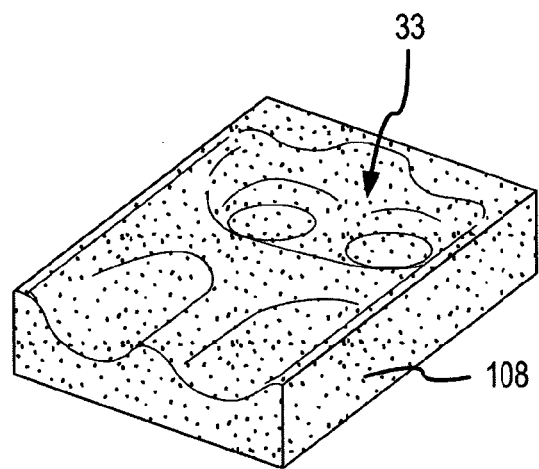

Because of the generally circular nature of the beads and the fact that the beads are fused together at contact points, the resulting matrix-like structure of adhered beads has porosity which allows air and liquid to pass through the matrix-like support structure 108 (FIG. 18). This is a particular advantage in wheelchair cushions, because the ventilation of air to the areas of skin which are at risk for pressure ulcers generally decreases the incidence of such pressure ulcers.

Figure 17:
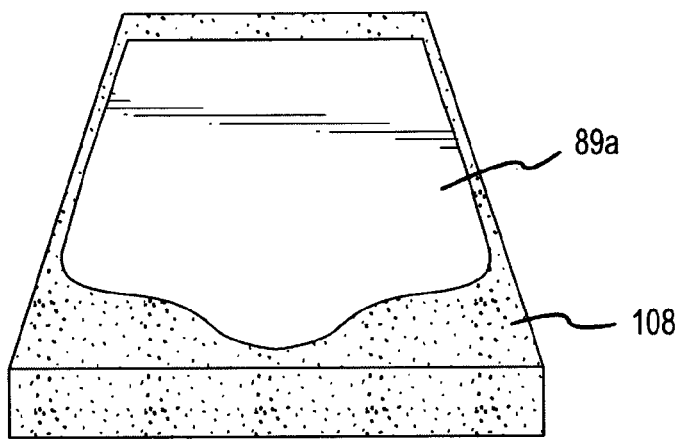

After the moldable material 102 has cured within the cushion-creating form 98 (FIG. 15), and the shape of the support structure 108 of the cushion has been defined by the positive mold 89 (FIG. 14), the form 108 is removed, as shown in FIG. 17. The positive mold 89 remains within the support structure 108 as shown in FIG. 17. Next, as shown at 110 in FIG. 3 and in FIG. 18, the positive mold 89 is removed from within the support structure 108, revealing the cushion support contour 33 created in the support structure 108. Of course the support contour 33 has the shape of the positive mold 89a, which created the areas 91 and 95 of greater relief and enhanced protrusion, respectively.

Figure 19:
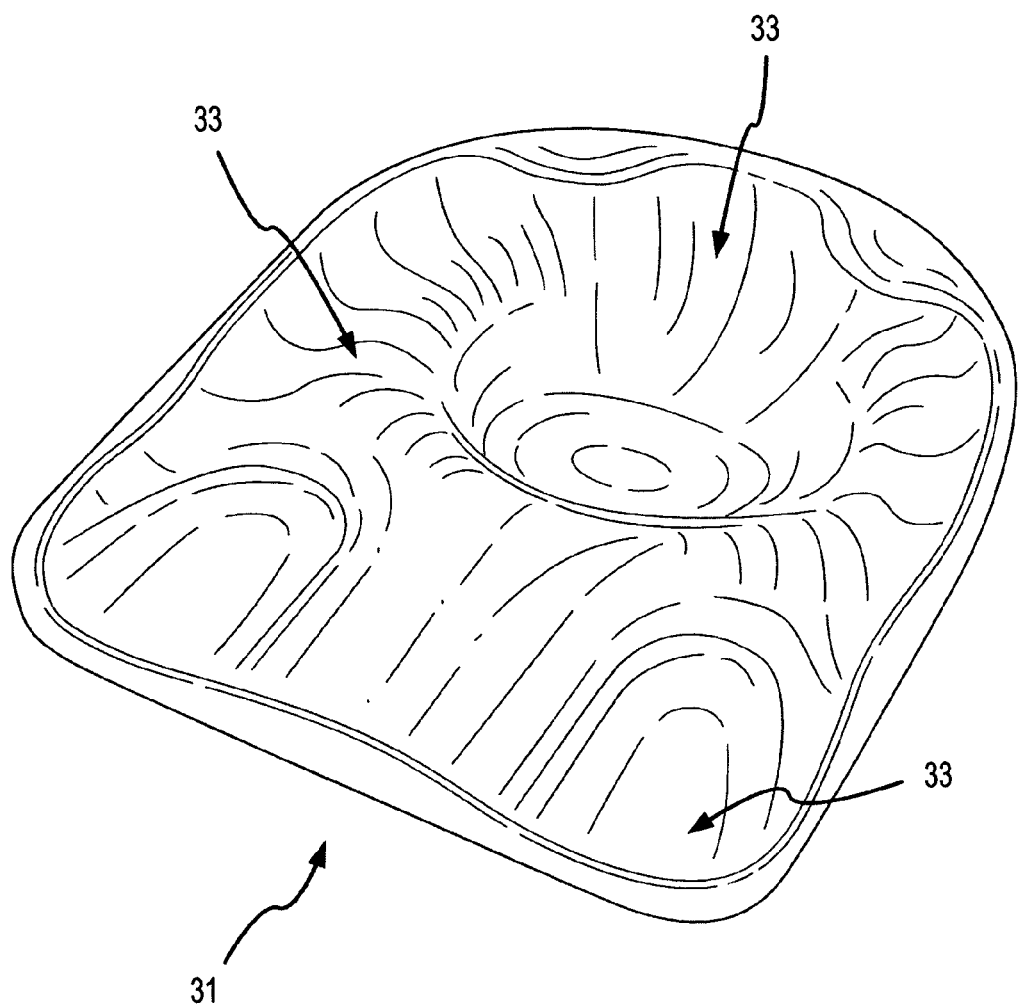
FIG. 19 is a perspective view of the finished cushion made by trimming and contouring the support structure shown in FIG. 18.

The completed cushion 31 is created by trimming or otherwise shaping the support structure 108 into the desired exterior shape of the cushion 31, as shown at 112 in FIG. 3 and in FIG. 19. Only that portion of the support structure 108 outside of the support contour 33 is trimmed away, since the configuration of the support contour 33 has been previously established as a result of using the impression foam in the manner described above. After trimming the excess amount of support structure 108 to create the cushion 31 shown in FIG. 19, the matrix-like structure of fused-together polyethylene beads may be encased within a covering (not shown) to complete the construction of the cushion.

As an alternative to trimming the excess support structure 108 to form the cushion 31, the shape of the cushion-creating form 98 may be configured to establish the final cushion shape around the positive mold 89. In that case, the resulting support structure 108 becomes the cushion 31.

As is apparent from the previous discussion, the use of the impression foam having the characteristics described allows a very accurate negative impression of the anatomical portion of the user to be obtained. This very accurate negative impression 35 is obtained without the use of expensive and sophisticated shape simulators. After adjusting the negative impression 35, if desired, the adjusted negative impression 35a is used directly to create the positive mold 89 from which the support contour 33 of the cushion 31 is formed. No measurements are required, no translation of those measurements into a sophisticated mathematical shape simulating algorithm is required, and no separate creation of a positive mold based on a simulating algorithm is required. The block 30 of impression foam retained within the container 32 may be readily transferred to the location of the user, and transferred from the user to the manufacturer. The crush resistance characteristics of the impression foam also permit adjustments of the negative impression to accommodate a range of user movement. The negative impression formed in the foam block can be tried by the user before the completed cushion is constructed. The cost of the custom cushion is reduced as a result of these and other factors, while still obtaining a better degree of fit and support in the resulting cushion. Many other advantages and improvements will be apparent after gaining a full appreciation of the present invention.

Presently preferred embodiments of the invention and many of its improvements and advantages have been described with a degree of particularity. This description is of preferred examples of implementing the invention, and the description of the preferred examples is not necessarily intended to limit the scope of the invention. The scope of the invention is defined by the following claims.

What is claimed:

1. A method of capturing a negative impression of an anatomical portion of a person, comprising:
    selecting a piece of impression foam having a crush resistance characteristic of substantially constant crushing force per unit area over a predetermined range of collapse distances;
    forcing the anatomical portion into the piece of impression foam to create the negative impression by collapsing the impression foam; and
    collapsing the impression foam only within the predetermined range of collapse distances within which the crushing force per unit area is substantially constant while creating the negative impression.

2. A method as defined in claim 1, further comprising:
    selecting the impression foam to have the crush resistance characteristic in which the predetermined range of collapse distances is at least 80% of an initial thickness of the piece of non-collapsed impression foam.

3. A method as defined in claim 2, further comprising:
    selecting the piece of impression foam to have the crush resistance characteristic in which the constant crushing force per unit area is within the range of 1.50 to 1.85 pounds per square inch.

4. A method as defined in claim 1, further comprising:
    selecting the piece of impression foam to have the crush resistance characteristic in which the constant crushing force per unit area is within the range of 1.50 to 1.85 pounds per square inch.

5. A method as defined in claim 4, further comprising:
    selecting the piece of impression foam to have the crush resistance characteristic in which the constant crushing force per unit area is approximately 1.56 pounds per square inch.

6. A method as defined in claim 4, further comprising:
    selecting the piece of impression foam to have the crush resistance characteristic of a relative lack of structural shear force resistance to cause the impression foam to collapse into the negative impression in a form which substantially exactly complements the anatomical portion.

7. A method as defined in claim 4, further comprising:
    selecting the piece of impression foam to have the crush resistance characteristic of a relative lack of structural shear force resistance to cause the impression foam to collapse into the negative impression in a form which is substantially free of displacement or deformation at edges of the negative impression relative to the shape of the anatomical portion.

8. A method as defined in claim 1, further comprising:
    selecting an initial thickness of the piece of non-collapsed impression foam to result in collapsing the impression foam by no more than 90% of the initial thickness at any location on the negative impression.

9. A method as defined in claim 1, further comprising:
    seating or reclining the person on the impression foam to force the anatomical portion into the piece of impression foam.

10. A method as defined in claim 9, further comprising:
    forcing the anatomical portion into the piece of impression foam from weight of the person.

11. A method as defined in claim 1, used for creating a support contour for a seat cushion by which to support pelvic and proximal thigh anatomical portions of the person while sitting, further comprising:
    forcing the anatomical portions into the piece of impression foam to obtain the negative impression from anatomical portions which will be supported on the support contour.

12. A method as defined in claim 11, further comprising:
    selecting an initial thickness of the piece of impression foam which will collapse within the predetermined range of collapse distances to obtain the negative impression of the anatomical portions which will be supported on the support contour; and
    collapsing the impression foam within the predetermined range of collapse distances at every location of the negative impression of the anatomical portions which will be supported on the support contour.

13. A method as defined in claim 11, further comprising:
    sitting the person on the piece of impression foam to force the anatomical portions into the impression foam.

14. A method as defined in claim 13, further comprising:
    forcing the anatomical portions into the piece of impression foam by applying force to the person beyond the weight of the person.

15. A method as defined in claim 13, further comprising:
    moving the person through a range of movement while the person is sitting on the piece of impression foam.

16. A method as defined in claim 15, used for creating a seat cushion for a wheelchair having a seat support structure for supporting the person while seated on the seat cushion.

17. A method as defined in claim 16, further comprising:
    positioning the piece of impression foam on the seat support structure of the wheelchair; and
    sitting the person on the piece of impression foam positioned on the seat support structure.

18. A method as defined in claim 17, further comprising:
    maneuvering the wheelchair from actions of the person sitting on the piece of impression foam on the seat support structure.

19. A method as defined in claim 17, further comprising:
    moving the person through a range of normal movement while sitting on the piece of impression foam.

20. A method as defined in claim 19, further comprising:
    establishing the range of normal movement to encompass the types of movement performed by the person when sitting on the seat cushion during typical use of the wheelchair.

21. A method as defined in claim 17, further comprising:
    collapsing the impression foam by moving the person through a range of movement to an extent that the negative impression created encompasses changes in position of the anatomical portions of the person when sitting on the seat cushion during typical use of the wheelchair.

22. A method as defined in claim 13, further comprising:
    removing the person from sitting on the piece of impression foam; and using the negative impression as a mold to create a positive mold configuration of the anatomical portions; and using the positive mold configuration to create the support contour for the seat cushion.

23. A method as defined in claim 22, further comprising:
further collapsing the impression foam at selected relief areas of the negative impression to create an adjusted negative impression.

24. A method as defined in claim 23, further comprising:
locating the selected relief areas to obtain further clearance from the support contour at the location of at the ischial tuberosities, greater trochanters, and coccyx and sacrum of the person.

25. A method as defined in claim 24, further comprising:
establishing the extent of further clearance at the relief areas by the extent of further collapsing the impression foam at the relief areas.

26. A method as defined in claim 24, further comprising:
using the adjusted negative impression as a mold to create the positive mold configuration of the anatomical portions.

27. A method as defined in claim 26, further comprising:
molding the support contour of the seat cushion from the positive mold configuration.

28. A method as defined in claim 27, further comprising:
molding the seat cushion from fused together resilient plastic beads.

29. A method as defined in claim 28, further comprising:
fusing the resilient plastic beads together at contact points which permit spaces between the beads to establish air ventilation permeability within the seat cushion.

30. A method as defined in claim 22, further comprising:
molding the support contour of the seat cushion from the positive mold configuration.

31. A method as defined in claim 30, further comprising:
molding the seat cushion from fused together resilient plastic beads.

32. A method as defined in claim 31, further comprising:
fusing the resilient plastic beads together at contact points which permit spaces between the beads to establish air ventilation permeability within the seat cushion.

33. A method as defined in claim 13, used for creating a seat cushion for a wheelchair having a support contour for supporting the cushion, further comprising:
positioning the piece of impression foam on the seat support structure of the wheelchair; and
sitting the person on the piece of impression foam positioned on the seat support structure.

34. A method as defined in claim 13, used for creating a seat cushion for a wheelchair having a shell seat for supporting the cushion and the person within the shell seat, further comprising:
positioning the piece of impression foam in the shell seat; and
sitting the person on the piece of impression foam positioned in the shell seat.

35. A method as defined in claim 13, used for creating a seat cushion for a wheelchair having support contour for supporting the cushion, further comprising:
positioning the piece of impression foam on a seating simulator; and
sitting the person on the piece of impression foam positioned on the seating simulator.

36. A method as defined in claim 13, used for creating a seat cushion for a wheelchair having a support contour for supporting the cushion, further comprising:

positioning the piece of impression foam within a container to protect the impression foam from inadvertent collapse;
transporting the piece of impression foam within the container to the location of the person;
obtaining the negative impression from the person in the piece of impression foam at the location of the person;
transporting the piece of impression foam containing the negative impression within the container to a fabrication location which is substantially remote from the person; and
fabricating the seat cushion at the fabrication location with at least a portion of the support contour derived from a mold obtained from the negative impression.

37. A method as defined in claim 36, further comprising:
protecting the negative impression created in the piece of impression foam from inadvertent collapse while transporting the piece of impression foam containing the negative impression from the location of the person to the fabrication location.

38. A method as defined in claim 37, further comprising:
transporting by mail the piece of impression foam containing the negative impression from the location of the person to the fabrication location.

39. A method as defined in claim 1, further comprising:
positioning the piece of impression foam within a container having sides which surround the impression foam at locations other than which the negative impression is formed.

40. A method as defined in claim 26, further comprising:
removing material from the positive mold configuration at selected support areas to create an adjusted positive mold configuration; and
locating the selected support areas to obtain further protuberance from the support contour at the location of the lateral posterior buttocks and the proximal thighs of the person.

41. A method as defined in claim 40, further comprising:
molding the support contour of the seat cushion from the adjusted positive mold configuration.

42. A method as defined in claim 41, further comprising:
molding the seat cushion from fused together resilient plastic beads.

43. A method as defined in claim 42, further comprising:
fusing the resilient plastic beads together at contact points which permit spaces between the beads to establish air ventilation permeability within the seat cushion.

44. A method for creating a support contour for a seat cushion by which to support pelvic and proximal thigh anatomical portions of a person while sifting, comprising:
selecting impression foam having a crush resistance characteristic of substantially constant crushing force per unit area over a predetermined range of collapse distances;
sifting the person on the impression foam to force the anatomical portions which will be supported on the support contour into the impression foam to create a negative impression by collapsing the impression foam to an extent which falls within the predetermined range of collapse distances at every location of the negative impression contacted by the anatomical portions which will be supported on the support contour;
removing the person from sifting on the impression foam after collapsing the impression foam;
further collapsing the impression foam at selected relief areas of the negative impression to create an adjusted negative impression;
locating the selected relief areas to obtain further clearance from the support contour at the location of at least one of the ischial tuberosities, greater trochanters, coccyx and sacrum, and the perineal area of the person;

using the negative impression as a mold to create a positive mold configuration of the anatomical portions; and removing material from the positive mold configuration at selected support areas to create an adjusted positive mold configuration.

45. A method as defined in claim 44, further comprising:
locating the selected support areas to obtain further protuberance from the support contour at the location of at least one of the lateral posterior buttocks or the proximal thighs of the person.

46. A method as defined in claim 45, further comprising:
establishing the extent of further protuberance at the support areas by the extent of removing material from the positive mold at the support areas.

47. A method as defined in claim 46, further comprising:
using the adjusted positive mold configuration mold to define the support contour for the selected portion of the anatomical portions to be supported by the support contour; and molding the support contour of the seat cushion from the adjusted positive mold configuration.

48. A method as defined in claim 47, further comprising:
molding the seat cushion from fused together resilient plastic beads.

49. A method as defined in claim 48, further comprising:
fusing the resilient plastic beads together at contact points which permit spaces between the beads to establish air ventilation permeability within the seat cushion.

50. A method for creating a support contour for a seat cushion by which to support pelvic and proximal thigh anatomical portions of a person while sitting, comprising:
selecting impression foam having a crush resistance characteristic of substantially constant crushing force per unit area over a predetermined range of collapse distances;

sitting the person on the impression foam to force the anatomical portions which will be supported on the support contour into the impression foam to create a negative impression by collapsing the impression foam to an extent which falls within the predetermined range of collapse distances at every location of the negative impression contacted by the anatomical portions which will be supported on the support contour;

removing the person from sitting on the impression foam after collapsing the impression foam;

using the negative impression as a mold to create a positive mold configuration of the anatomical portions; and removing material from the positive mold configuration at selected support areas which will be part of the support contour to create an adjusted positive mold configuration.

51. A method as defined in claim 50, further comprising:
locating the selected support areas to obtain further protuberance from the support contour at the location of at least one of the lateral posterior buttocks or the proximal thighs of the person.

52. A method as defined in claim 51, further comprising:
establishing the extent of further protuberance at the support areas by the extent of removing material from the positive mold at the support areas.

53. A method as defined in claim 51, further comprising:
using the adjusted positive mold configuration mold to define the support contour for the anatomical portions to be supported by the support contour; and molding the support contour of the seat cushion from the positive mold configuration.

54. A method as defined in claim 53, further comprising:
molding the seat cushion from fused together resilient plastic beads.

55. A method as defined in claim 54, further comprising:
fusing the resilient plastic beads together at contact points which permit spaces between the beads to establish air ventilation permeability within the seat cushion.

56. A method of fabricating a seat cushion having a support contour for supporting a person at pelvic and proximal thigh anatomical portions of the person, comprising:
capturing a negative impression of the pelvic and proximal thigh anatomical portions;

creating a positive mold configuration of the anatomical portions using the captured negative impression;

fusing together a plurality of resilient plastic beads into a support structure which encompasses at least a portion of the positive mold configuration to define the support contour for the seat cushion: and fusing the resilient plastic beads together at contact points which permit spaces between the beads to establish air ventilation permeability within the support structure.

57. A method is defined in claim 56, further comprising:
capturing the negative impression by forcing the anatomical portions into a piece of impression foam to create the negative impression by collapsing the impression foam, the impression foam having a crush resistance characteristic of substantially constant crushing force per unit area over a predetermined range of collapse distances; and collapsing the impression foam only within the predetermined range of collapse distances within which the crushing force per unit area is constant.

58. A method of fabricating a cushion having a support structure for supporting a person in a wheelchair, comprising:
utilizing a matrix of resilient fused-together plastic beads as the support structure, the plastic beads in the matrix being fused together at contact points which permit spaces between the beads to establish air ventilation permeability within the matrix:

shaping a human-interface side into the matrix of resilient fused-together plastic beads, the human-interface side defining a support contour which contacts the person; and configuring another side of the matrix of resilient fused-together plastic beads to contact the wheelchair.

59. A method as defined in claim 58, further comprising:
fusing together the plastic beads into the matrix to form the support structure; and molding the plastic beads of the matrix into the human-interface side simultaneously with fusing together the plastic beads into the matrix.

60. A method as defined in claim 59, further comprising:
utilizing plastic beads having different resilient characteristics in different portions of the support structure when fusing together the matrix of plastic beads to form the support structure.

61. A method as defined in claim 60, further comprising:
locating plastic beads having relatively greater resilient characteristics in a portion of the support structure adjacent to the human-interface side; and locating plastic beads having relatively lesser resilient characteristics in a portion of the support structure adjacent to the wheelchair-interface side.

* * * * *